Figure 1:
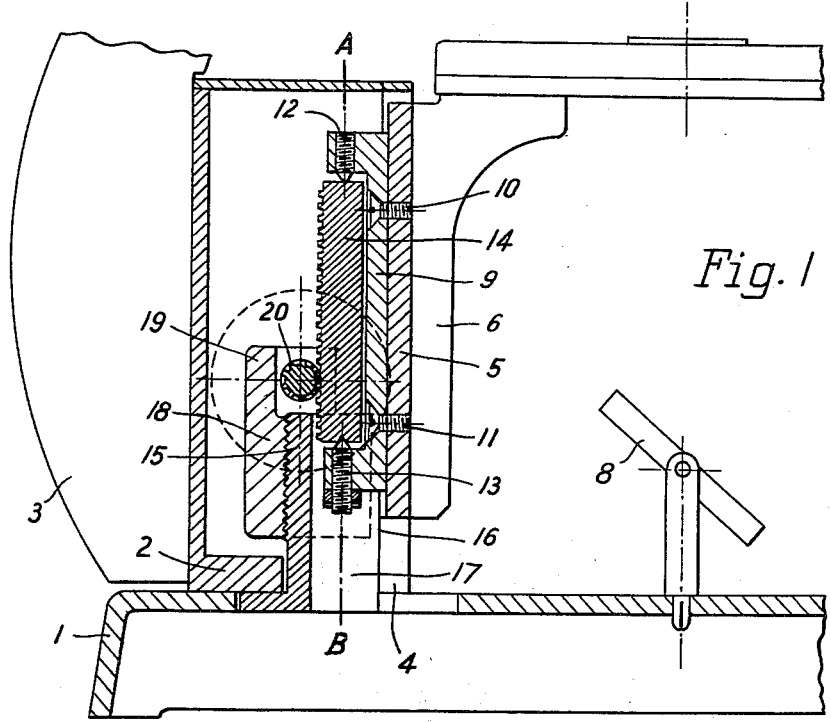

April 27, 1965     K. WASNER     3,180,161
ADJUSTING DEVICE

Filed July 12, 1961     2 Sheets-Sheet 1

INVENTOR
Karl Wasner
BY Michael S. Striker
ATTORNEY

3,180,161
ADJUSTING DEVICE
Karl Wasner, Vienna, Austria, assignor to C. Reichert Optische Werke Aktiengesellschaft, Vienna, Austria
Filed July 12, 1961, Ser. No. 123,980
Claims priority, application Austria, July 16, 1960, A 5,478/60
2 Claims. (Cl. 74—91)

For the focussing of microscopes adjusting devices have hitherto been used in which coarse and fine adjustments could be effected by the operation of different drive knobs.

With microscopes of the older type of construction the coarse and fine adjusting devices are separated from one another and the respective operating knobs are arranged at some distance from one another. Because the change of grip from one knob to another is inconvenient, on microscopes of the newer type of construction the coarse and fine operating knobs are arranged coaxially. On account of the necessarily greater constructional expense connected therewith, however, the convenience obtained in service is accompanied by the disadvantage of higher initial costs.

A further simplification in operation and construction was evolved recently with the introduction of single-knob combination drives. To avoid misunderstanding, let it be noted here that it is usual to use the term "single-knob," in an arrangement in which in order to provide for left- or right-handed operation of the microscope a drive knob is secured on both ends of the driveshaft.

One of these recent single-knob combination drives functions as follows: if one turns the drive knob in a direction determined by the construction, there results a coarse movement of the adjusting elements of the microscope. With a limited rotation of the same knob in the opposite direction, the drive mechanism, however, is automatically changed over to fine movement.

The transition from the coarse to the fine adjustment can thereby be effected very easily without any change of knobs.

A disadvantage of this automatic switch-over from the coarse movement to the fine movement by turning back the drive knob lies in the fact that the optimum coarse adjustment cannot be achieved in the way preferred by practitioners, i.e., by a short forward and backward turning of the coarse drive knob.

This arrangement is not completely satisfactory, especially with the focussing of the low-power microscope objectives, because here on account of the greater depth of focus the condition of optional sharp adjustment can be judged, as is well known, only by coarse forward and backward movements.

The present invention avoids the disadvantages set out and has additional advantages. It relates to a fine movement mechanism for mechanical-optical apparatus, especially for microscopes, with a coarse adjustment mechanism in which the turning of a coarse drive shaft over at least one intermediate member engaged on the latter, e.g., a toothed rack or a cable line, effects the movement of a part sliding in a guide, and is in essential characterised in this, that the coarse drive shaft is supported in a bearing piece, which is swingable about an axis not coinciding with the coarse drive shaft, whereby the engagement point of an intermediate member on the coarse drive shaft is adjusted in the direction of the guide, the relative position of the intermediate members and the coarse drive shaft however remaining unchanged. It is of course equivalent for the invention, if from one coarse drive shaft one or several intermediate wheels also supported on the bearing piece are connected in series, on which then one intermediate member engages.

The mechanism according to the invention provides, while avoiding the disadvantages of known constructions, the great advantage that one need not take the hand from the operating knob when changing over from the coarse movement to the fine movement or conversely, but need only either swing or turn the one knob. A further advantage of this combination drive resides in the fact, that, during the last phases of the coarse adjustment process, the knob can be simultaneously swung to give fine adjustment if desired.

The object of the invention can be carried out in various ways, and notably one can have the swing axis of the bearing piece in various directions relative to the shaft. If one disposes the said swing axis parallel to the guide, it is especially advantageous that the bearing piece carries an internal thread and the complementarily threaded part engaged in this thread is secured fast to the guide. In this case by swinging of the coarse drive shaft with the guide the whole coarse adjusting device is adjusted finely lengthwise of the axis of the thread in the direction of the guide. One can however according to the invention also so construct the bearing piece swingably around a bolt joined fast and parallel to the guide and abutting against on a part fast with the guide, whereby at least one of the parts abutting against each other is provided in the region of the contact with a helical surface coaxial with the bolt. In this case if one swings the coarse drive shaft, then the bearing piece moves also together with the coarse adjusting equipment as a result of the helical surface in the direction of the guide. For easing of the motion the interposition of glide elements, such as rollers or balls, is advantageous.

To connect the coarse drive shaft with the part to be adjusted an intermediate member in form of a wire or tape led over a roller may be used, which wire or tape is secured on the one hand to the guided part and on the other hand to a drum shaped section of the coarse drive shaft, so that upon turning the coarse drive shaft this wire or tape is wound on the drum and thereby the movable part of the guide is coarsely adjusted. It is also possible to use as intermediate member a toothed rack having teeth with cylindrically curved lands, which is secured on the guided part coaxially of the swing axis of the bearing part and meshes with a section of the coarse drive shaft formed as a pinion or with an intermediate wheel connected in series to the pinion. This kind of gearing is necessary, to avoid engagement difficulties between pinion and toothed rack upon swinging of the coarse drive shaft. According to the invention this problem can however also be solved by forming the intermediate member in form of a toothed rack, which, running parallel to the swing-axis of the bearing piece, is supported swingably coaxial with the latter on the guided part and meshes with a section of the coarse drive shaft formed as a pinion or with an intermediate wheel connected in series to the pinion.

It is also possible to arrange the swing-axis of the bearing piece for the coarse drive shaft parallel to the coarse drive shaft. Advantageously the intermediate piece is then a toothed rack which, arranged substantially parallel to the guide, swingably pivoted to the guided part about an axis parallel to the coarse drive shaft and meshing with a section of the coarse drive shaft formed as a pinion. A shifting of the engagement point of the pinion and toothed rack and therewith of the movable part of the guide will be produced with this arrangement upon swinging of the coarse drive shaft. To avoid excessive swing movements of the coarse drive shaft and of the bearing piece, the engagement position of the pinion and toothed rack advantageously lies outside the plane containing the swing axis of the bearing piece and the toothed rack. In this case it is especially advantageous to arrange a spring near the pinion and acting on the rear of the toothed rack to maintain the engagement of the latter with the pinion.

Finally according to the invention the bearing piece can be swingable, on a part fast secured to the guide, about an axis normal to the guide and to the coarse drive shaft, the intermediate member then being a wire or tape led over a roller and secured on the one hand to the guided part and on the other hand in such manner to a drum-shaped section of the coarse drive shaft that the line of action of the wire or tape and the swing axis of the bearing piece cross one another, with clearance. Again there results upon turning the coarse drive shaft a winding of the wire and thereby a coarse adjustment, while by swinging the coarse drive shaft there results (on account of the special securing-point of the wire on the drum) a very fine adjustment of the wire in the direction of the guide.

The invention is now illustrated by reference to some examples shown in the drawing.

Figure 2:
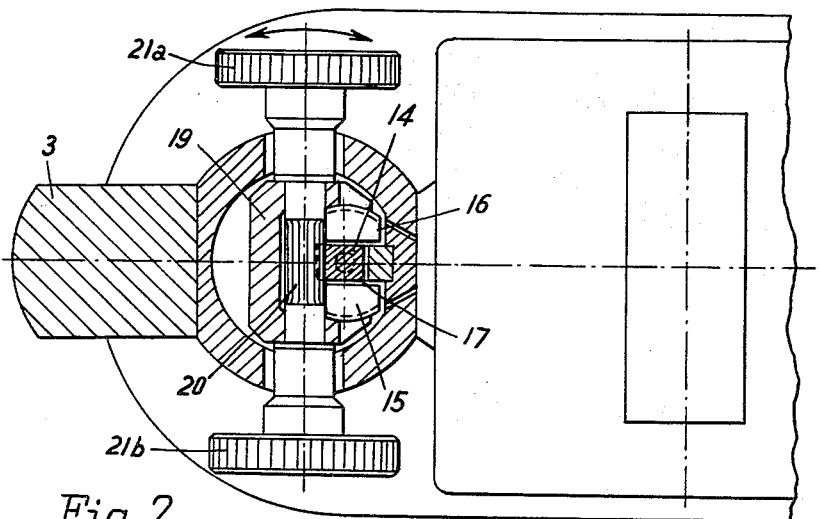
Figure 3:
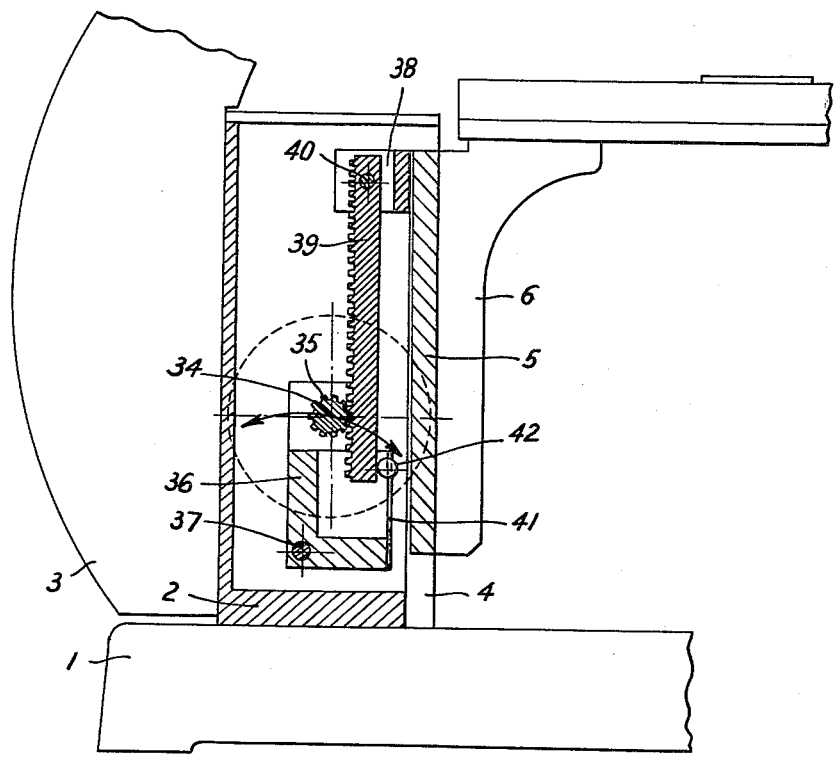

FIGS. 1 and 2 show (partially in section) one embodiment of the invention with a swing-axis of the bearing piece parallel to the guide; and FIG. 3 shows an example with a swing-axis parallel to the coarse drive shaft.

In FIGS. 1 and 2 (which are elevation and plan views respectively) is shown an adjustment mechanism according to the invention, applied to a microscope, in which the coarse drive shaft can be swung about an axis parallel to the microscope axis. Coarse and fine adjustment operations cause movement of the microscope stage. For simplicity the upper part of the microscope with the tube and the objective is not shown.

The microscope pedestal 1, the gear case 2 and the handle 3 are secured to one another by screws (not shown). In the dovetail slide 4 of the gear case there slides as the guided part a dovetail 5 which is secured to a stage-carrier 6, which in turn carries a microscope stage 7. For completeness, there is also shown a mirror 8 mounted on the microscope pedestal 1, which directs the light into the microscope. A pair of pivot screws 12 and 13 are mounted spaced from each other in longitudinal direction on a bearing part 9, which by means of screws 10 and 11 is fixedly secured to the dovetail 5 and an intermediate member in form of a toothed rack 14 is supported on the pivot screws 12, 13 swingably about an axis A–B parallel to the microscope axis. Into the gear case 2 and fast secured to it projects a screw bolt 15, which (cf. FIG. 2) has on its periphery a flat 16 and a milled groove 17 extending in longitudinal direction of bolt 15 and radially inward from flat 16. A nut 18, which forms the lower portion of a bearing block 19 engages the screw thread provided on the cylindrical portion of screw bolt 15 and the upper portion of bearing block 19 constitutes a bearing piece which carries the coarse drive shaft with a gear 20 milled thereon turnably about an axis normal to that of bolt 15. By turning one of the drive knobs 21a or b fixed to opposite ends of the drive shaft in one or the other direction, the toothed rack and with it the microscope table 7, is moved, in usual manner be moved up or down for the coarse adjustment.

For the fine movement of the toothed rack and therewith of the microscope table, the coarse drive shaft together with the pinion 20 formed on it is swung about the axis A–B of the bearing piece in one of the two directions shown by the double arrow. Because the axis A–B is also at the same coincides with the common axis of the screw bolt 15 and the screw nut 18, the pinion 20 remains during such swinging for the fine adjustment always in unaltered constant engagement with the toothed rack 14, while the bearing piece 18, 19 with the coarse drive shaft supported therein together with the pinion 20 will be screwed up or down on the stationary screw bolt 15, whereby fine movements are imparted to the engagement point of the toothed rack on the pinion, and therewith to the microscope stage. If one chooses, for example, for the screw threads on the bolt nut a pitch of 1.5 mm. pitch and spaces the drive knobs from each other ca. 100 mm. on the coarse drive shaft, then a swing movement of one drive knob through the arc of 0.4 mm. length of arc yields will result in a fine adjustment of the microscope stage for a distance of 0.002 mm.

FIG. 3 shows partly in section an embodiment of the invention with a coarse drive shaft swingable about an axis parallel to this shaft. Again 1 designates the microscope pedestal, 2 the gear case and 3 the handle. The guided dovetail 5, which slides in the guide 4 is joined with the stage carrier 6. The coarse drive shaft 34 with the pinion 35 is supported in the angle-section bearing piece 36, which, in turn, is swingable in the gear case 2 about the axis 37 parallel to the shaft 34. A toothed rack 39 is supported swingably about an axis 40 likewise parallel to the shaft 34 on a member 38 joined to the dovetail 5. A leaf spring 41 secured to the angle piece 36 assures the engagements of the pinion 35 in the toothed rack 39, which leaf spring presses on the toothed rack 39 by means of a roller 42. If one turns the coarse drive shaft 34 about its axis, then the pinion 35 moves the toothed rack 39 and with it the microscope stage up and down for the coarse adjustment. If one however swings the member 36 by means of the coarse drive shaft in the direction of the double arrow about the axis 37, then, the rack 39 will swing about the axis 40 since the pinion 35 is held in unaltered engagement with the toothed rack 39 by means of the springs. The shaft 34 together with the pinion 35, the rack 39 and the microscope table are thereby adjusted for limited amounts in the vertical direction, because the included angle between the planes passing respectively through the axes 37 and 40 as well as the engagement line of pinion and toothed rack will change during change of the position of the shaft 34. This swing movement of member 36 about the axis 37 effects therefore a fine adjustment of the microscope stage.

It needs no closer explanation, that the described examples can also be carried out with kinematic inversion. Especially the constructions according to FIGS. 1–3 also allow themselves to be so varied, that the part carrying the coarse drive shaft takes part in the course adjusted with the dovetail.

As a further possibility it may be mentioned that the axis, about which the swinging of the coarse drive shaft occurs basically can lie also at a much greater distance from the microscope, so that the swing movement practically converts into a linear movement.

What I claim is:

1. An adjusting arrangement for a microscope comprising, in combination, a stationary microscope part; a movable microscope part mounted on said stationary part for movement along a rectilinear path; a coarse adjustment shaft; a bearing member carrying said coarse adjustment shaft turnable about its axis; mounting means mounting said bearing member on said stationary part pivotably about a pivot axis extending substantially parallel to said rectilinear path and including a pivot pin fixed to said stationary part and having an axis coinciding with said pivot axis, said bearing member and said pivot pin being formed with cooperating screw threads extending about said pivot axis so that during turning of said bearing member about said pivot axis said member is shifted in direction of said axis; a toothed rack extending substantially parallel to said path; a pair of pivot screws extending spaced from each other along said pivot axis and connected to said movable part and respectively engaging opposite ends of said rack for carrying the latter for pivotal movement about said pivot axis; and a pinion fixed to said coarse adjustment shaft and meshing with said rack, whereby turning said shaft about its axis will cause rough adjustment of the position of said movable microscope part and turning said bearing member about said pivot axis will cause fine adjustment of said position.

2. An arrangement as defined in claim 1 in which said stationary part includes a hollow substantially cylindrical portion enclosing said bearing member, said pivot pin, said rack, and said pinion and being formed with a pair of opposite openings through which opposite ends of said coarse adjustment shaft respectively extend with ample clearance, and including a knob fixed to each of said opposite ends of said shaft.

References Cited by the Examiner
UNITED STATES PATENTS

| | | | |
|---|---|---|---|
| 693,258 | 2/02 | Gibson | 251—250 |
| 1,573,210 | 2/26 | Whidden | 251—250 |
| 2,984,167 | 5/61 | Staubach | 88—39 |
| 2,994,258 | 8/61 | Schaffer et al. | 95—45 |

OTHER REFERENCES

Publication: Revue d'Optique, vol. 34, 1955, page 409.

BROUGHTON G. DURHAM, *Primary Examiner.*